US009229148B2

(12) United States Patent
Cho et al.

(10) Patent No.: US 9,229,148 B2
(45) Date of Patent: Jan. 5, 2016

(54) LIGHT GUIDE PLATE AND DISPLAY APPARATUS INCLUDING THE SAME

(75) Inventors: Hyun Jin Cho, Seoul (KR); Byoungho Cheong, Yongin-si (KR); Prudnikov Oleg, Suwon-si (KR); Hyundeok Im, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 713 days.

(21) Appl. No.: 13/232,301

(22) Filed: Sep. 14, 2011

(65) Prior Publication Data
US 2012/0106196 A1 May 3, 2012

(30) Foreign Application Priority Data

Oct. 29, 2010 (KR) ........................ 10-2010-0106957

(51) Int. Cl.
B64D 47/02 (2006.01)
F21V 8/00 (2006.01)

(52) U.S. Cl.
CPC .............. G02B 6/002 (2013.01); G02B 6/0046 (2013.01); G02B 6/0068 (2013.01); G02B 6/0073 (2013.01)

(58) Field of Classification Search
CPC ... G02B 6/0036; G02B 6/0038; G02B 6/0016
USPC ........... 362/623, 615, 628, 612; 357/726–736
See application file for complete search history.

(56) References Cited

U.S. PATENT DOCUMENTS

2003/0137821 A1* 7/2003 Gotoh et al. .................... 362/31
2006/0164861 A1* 7/2006 Maeda et al. ................. 362/615
2007/0274100 A1* 11/2007 Yang et al. .................... 362/615

FOREIGN PATENT DOCUMENTS

JP        11-260132      9/1999
JP        2009-128627    6/2009
KR       1020060034725   4/2006

* cited by examiner

Primary Examiner — Nimeshkumar Patel
Assistant Examiner — Jacob R Stern
(74) Attorney, Agent, or Firm — F. Chau & Associates, LLC (57) ABSTRACT

A light guide plate includes a light incident surface, a light facing surface facing the light incident surface, a connection surface connecting the light incident surface with the light facing surface, and a top surface connected with the light incident surface, the light facing surface, and the connection surface. The light incident surface receives light from a light source, the light facing surface reflects light, and the top surface outputs light toward a display panel. The connection surface includes at least two absorption surfaces parallel to a straight line linking a center of an arc with an end of the light incident surface and at least one reflective surface interposed the two adjacent absorption surfaces to reflect the light.

22 Claims, 12 Drawing Sheets

LIGHT GUIDE PLATE AND DISPLAY APPARATUS INCLUDING THE SAME

CROSS-REFERENCE TO RELATED APPLICATION

This application claims priority to Korean Patent Application No. 10-2010-0106957 filed on Oct. 29, 2010, the contents of which are herein incorporated by reference in their entirety.

BACKGROUND

1. Technical Field

Embodiments of the present invention relate to a light guide plate and a display apparatus including the light guide plate, and more particularly to a light guide plate capable of improving display quality and a display apparatus including the light guide plate.

2. Discussion of the Related Art

A liquid crystal display (LCD) includes a display panel to display an image and a backlight unit to supply light to the display panel.

The backlight unit includes a line light source or a point light source and a light guide plate to guide light emitted from the light source toward the display panel. The light guide plate converts light output from the line light source or the point light source into surface light and provides the surface light to the display panel.

To ensure low power consumption and a thin profile, there is a need for a display apparatus that may maintain uniform display quality over the whole display region with a relatively small number of lamps.

SUMMARY

Exemplary embodiments of the present invention provide a light guide plate capable of improving display quality and a display apparatus including the light guide plate.

According to an exemplary embodiment, the light guide plate includes a light incident surface, a light facing surface facing the light incident surface, a connection surface connecting the light incident surface with the light facing surface, a top surface connected with the light incident surface, the light facing surface, and the connection surface, and a bottom surface facing the top surface.

The light incident surface receives light from a light source, the light facing surface reflects the light, and the top surface outputs the light toward a display panel. The connection surface includes at least two absorption surfaces parallel to a straight line linking the center of an arc with one end of the light incident surface and at least one reflective surface interposed the two adjacent absorption surfaces to reflect the light.

According to an exemplary embodiment, the display apparatus includes at least one light source outputting light, the light guide plate guiding the light, and the display panel receiving the light from the light guide plate to display an image.

As described above, the path of light traveling toward the side portion of the light guide plate is changed by forming absorption surfaces and reflective surfaces on the connection surfaces of the light guide plate, thereby providing the light guide plate providing uniform brightness throughout the whole display region while maintaining a narrower width.

In addition, the display apparatus capable of improving display quality by employing the light guide plate can be provided.

BRIEF DESCRIPTION OF THE DRAWINGS

The embodiments of the present invention will become readily apparent by reference to the following detailed description when considered in conjunction with the accompanying drawings wherein.

DETAILED DESCRIPTION

Hereinafter, exemplary embodiments of the present invention will be described in detail with reference to the accompanying drawings, wherein the same reference numerals may be used to denote the same or substantially the same components throughout the drawings and the specification. However, the present invention is not limited to the embodiments set forth herein but may include various applications and modifications. In the drawings, the size of the layers and regions may be simplified or exaggerated for precise explanation or emphasis FIG. 1 is an exploded perspective view illustrating a display apparatus including a light guide plate according to an embodiment of the present invention.

Figure 1:
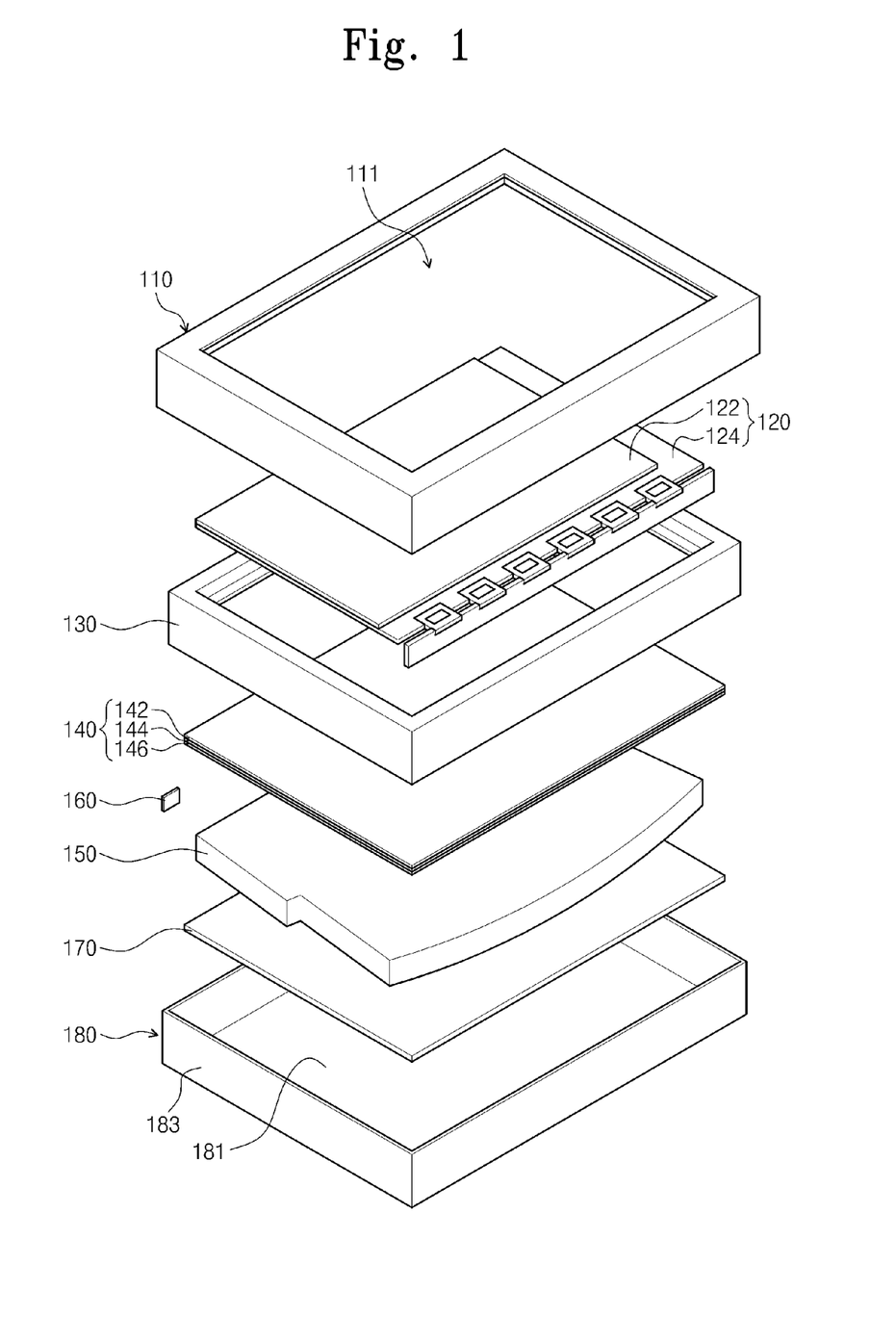
FIG. 1 is an exploded perspective view illustrating a display apparatus including a light guide plate according to an embodiment of the present invention.

Referring to FIG. 1, the display apparatus includes a display panel 120, a mold frame 130, a backlight assembly, a bottom chassis 180, and a top chassis 110.

The display panel 120 displays an image. The display panel 120 is a non-emissive device. The display panel 120 may include various display panels, such as a liquid crystal display panel or an electrophoretic display panel. Hereinafter, the liquid crystal display panel will be described as an embodiment of the present invention.

The display panel 120 has a rectangular shape having longer and shorter sides. The display panel 120 includes a first substrate 124, a second substrate 122 facing the first substrate 124, and a liquid crystal layer (not shown) between the first and second substrates 124 and 122.

According to an exemplary embodiment of the present invention, the first substrate 124 includes a plurality of pixel electrodes (not shown) and a plurality of thin film transistors (not shown) electrically connected to the pixel electrodes, respectively. Each thin film transistor switches a driving signal provided to a corresponding pixel electrode. The second substrate 122 may include a common electrode (not shown) that forms an electric field together with the pixel electrodes to thereby adjust the arrangement of liquid crystal molecules. The electric field adjusts the orientation of the liquid crystal layer to display an image at a front of the display panel 120.

The mold frame 130 is provided under the display panel 120 to support the display panel 120. The mold frame 130 has a shape of substantially a rectangular frame. Although a single mold frame 130 is provided as shown in FIG. 1, a plurality of mold frames may be provided or assembled according to an embodiment.

The backlight assembly is provided under the display panel 120 to supply light to the display panel 120. The backlight assembly includes a light source 160 to output light, a light guide plate 150 to guide the light toward the display panel 120, optical sheets 140 to enhance light efficiency, and a reflective sheet 170 to change a traveling direction of the light.

The light source 160 supplies light, which is used by the display panel 120 to display an image, to the light guide plate 150. The light source 160 may have various forms, such as a point light source, a line light source, and a surface light source, but the embodiments of the present invention are not limited thereto. According to an embodiment, a point light source capable of adjusting an orientation angle of light may be used as the light source 160. According to an embodiment of the present invention, one or more light emitting diodes (LEDs) may be used as a point light source. According to an embodiment, a plurality of LEDs may be separately provided at one side or more of the light guide plate 150. According to an embodiment, a plurality of LEDs may be arranged in a row on a printed circuit board that has a flat shape. The LEDs are provided at one side or more of the light guide plate 150.

The light guide plate 150 is provided under the display panel 120 to guide light toward the display panel 120. The light guide plate 150 will be described below in further detail with reference to FIGS. 2A to 2C.

The optical sheets 140 are interposed between the light guide plate 150 and the display panel 120. The optical sheets 140 control light emitted from the light source 160. The optical sheets 140 include a diffusion sheet 146, a prism sheet 144, and a protective sheet 142 sequentially stacked on the light guide plate 150.

The diffusion sheet 146 diffuses light. The prism sheet 144 collects light, which has been diffused by the diffusion sheet 146, in a direction perpendicular to a plane of the display panel 120. Light passing through the prism sheet 144 is mostly incident onto the display panel 120 perpendicular to the display panel 120. The protective sheet 142 is provided on the prism sheet 144. The protective sheet 142 protects the prism sheet 144 from external shocks. Although it has been described that each of the diffusion sheet 146, the prism sheet 144, and the protective sheet 142 has a singular structure, the embodiments of the present invention are not limited thereto. For example, according to an embodiment, at least one of the diffusion sheet 146, the prism sheet 144, and the protective sheet 142 may have a multilayer structure. According to an embodiment, any one of the diffusion sheet 146, the prism sheet 144, and the protective sheet 142 may be omitted from the optical sheets 140. According to an embodiment, the diffusion sheet 146, the prism sheet 144, and the protective sheet 142 may be stacked in different orders.

The reflective sheet 170 is provided under the light guide plate 150 and reflects light, which leaks to the reflective sheet 170, back to the display panel 120. The reflective sheet 170 is provided on the bottom chassis 180. As a result, an amount of light provided to the display panel 120 is increased by the reflective sheet.

The top chassis 110 is provided above the display panel 120. The top chassis 110 may support edges of a front surface of the display panel 120 and cover lateral surfaces of the mold frame 130 or lateral surfaces of the bottom chassis 180. The top chassis 110 has a display window 111 to expose a display region of the display panel 120.

The bottom chassis 180 is provided under the backlight assembly to receive the backlight assembly. The bottom chassis 180 may include a bottom section 181 provided under the reflective sheet 170 in parallel to a rear surface of the reflective sheet 170 and a sidewall section 183 bent upward from the bottom section 181. The backlight assembly is received in a space defined by the bottom section 181 and the sidewall section 183.

Figure 2A:
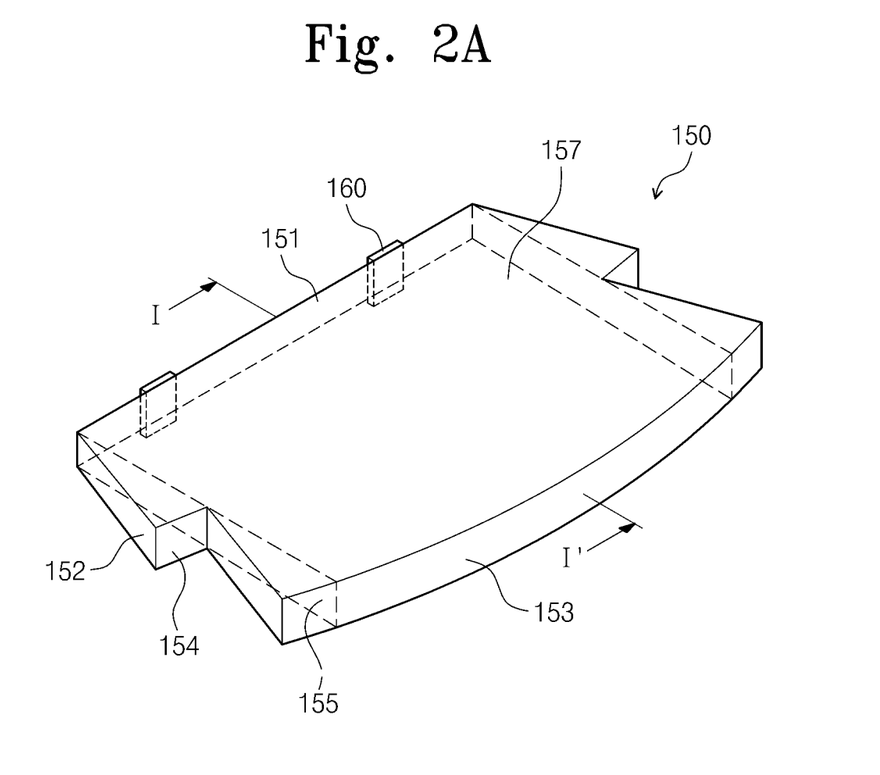
FIG. 2A is a perspective view illustrating a light guide plate and a light source according to an embodiment of the present invention.
Figure 2B:
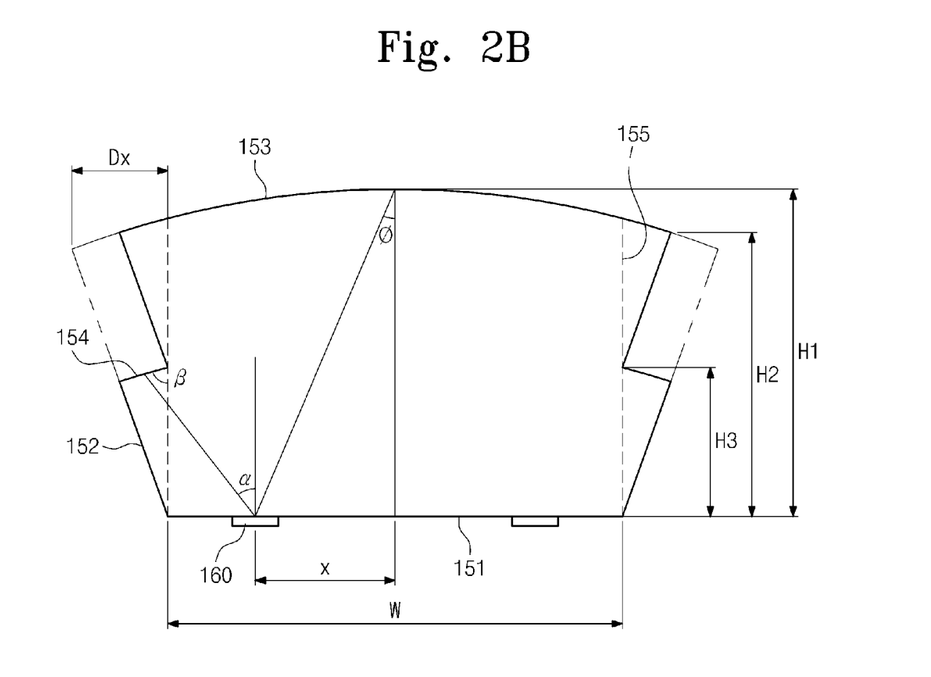
FIG. 2B is a plan view illustrating a light guide plate and a light source according to an embodiment of the present invention.
Figure 2C:
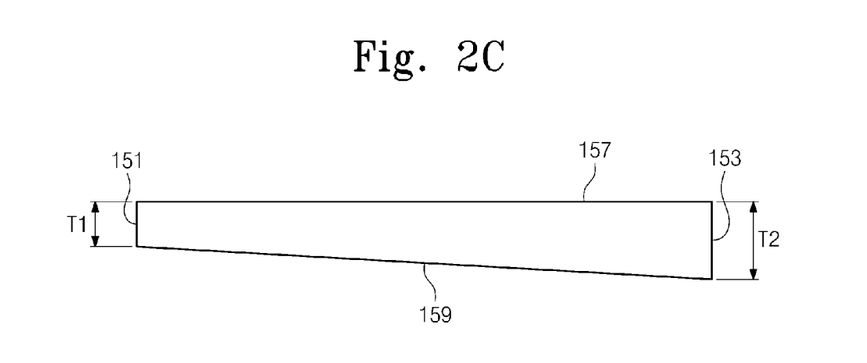
FIG. 2C is a cross-sectional view illustrating a light guide plate according to an embodiment of the present invention.

FIGS. 2A, 2B, and 2C are a perspective view, a plan view, and a cross-sectional view, respectively, of the light guide plate 150 and the light source 160. FIG. 2C is a cross-sectional view taken along line I-I' of FIG. 2A. Referring to FIGS. 2A to 2C, two light sources 160 are provided at a side of the light guide plate 150. Although it has been illustrated in FIGS. 2A and 2B that the light sources 160 contact the light guide plate 150 for convenience of description, the light sources 160 may be spaced apart from the light guide plate 150.

According to an embodiment, an additional member may be interposed between the light sources 160 and the light guide plate 150 to concentrate light from the light sources 160.

Referring to FIG. 1 and FIGS. 2A to 2C, the light guide plate 150 has a top surface 157, a bottom surface 159, and a plurality of lateral surfaces 151, 152, 153, and 154. The light guide plate 150 has wide top and bottom surfaces 157 and 159 and the lateral surfaces 151, 152, 153, and 154 narrower than the top and bottom surfaces 157 and 159.

The top surface 157 is parallel to the display panel 120, and the bottom surface 159 faces the top surface 157. In this case, since the light received by the light guide plate 150 is provided toward the display panel 120 through the top surface 157, the top surface 157 serves as a light exit surface.

The lateral surfaces 151, 152, 153, and 154 link the top surface 157 with the bottom surface 159, and include a light incident surface 151, a light facing surface 153, and connection surfaces 152 and 154.

The light incident surface 151 faces the light sources 160 to receive light from the light sources 160. The light incident surface 151 has a flat shape.

The light facing surface 153 faces the light incident surface 151 to reflect light. The light facing surface 153 has a curved shape, such as an arc shape in plan view. Since the light facing surface 153 has an arc shape, even if light beams travel in various directions toward the light facing surface 153, light beams reflected by the light facing surface 153 may be oriented in a specific direction. According to an embodiment, a distance between a center of the light incident surface 151 and a point of the light facing surface 153, at which a normal line to the light incident surface 151 passing through the center of the light incident surface 151 meets the light facing surface 153, that is, a height of the light guide plate 150, may correspond to a half of a radius of a circle that may include the arc as a part of its circumference.

A thickness of the light guide plate 150, for example, between the top surface 157 and the bottom surface 159 increases in a direction toward the light facing surface 153 away from the light incident surface 151. Assuming that a first thickness T1 is a thickness between the top and bottom surfaces 157 and 159 at the light incident surface 151, and a second thickness T2 is a thickness between the top and bottom surfaces 157 and 159 at the light facing surface 153, the second thickness T2 is greater than the first thickness T1.

The connection surfaces 152 and 154 connect first ends of the light incident surface 151 and the light facing surface 153 with each other, and connect second ends of the light incident surface 151 and the light facing surface 153 with each other.

The connection surfaces 152 and 154 include at least two absorption surfaces 152 and at least one reflective surface 154 between the two adjacent absorption surfaces 152. The absorption surfaces 152 and the reflective surface 154 (or reflective surfaces 154) are alternately arranged. One absorption surface 152 is connected to the first end of the light incident surface 151, and another absorption surface 152 is connected to the first end of the light facing surface 153.

The absorption surfaces 152 absorb light traveling in the direction of the absorption surfaces 152. The absorption surfaces 152 are parallel to a straight line linking a center of the arc with the light sources 160 when viewed in a plan view. Light beams reflected by the light facing surface 153 are oriented in predetermined directions. Light loss can be reduced by arranging the absorption surfaces 152 to be substantially parallel to the predetermined directions.

According to an embodiment, a light absorption member may be added to the absorption surfaces 152 such that light can be easily absorbed by the absorption surfaces 152. For example, according to an embodiment, a black pigment may be coated on the absorption surfaces 152.

The reflective surface 154 reflects light incident onto the reflective surface 154. The reflective surface 154 is in the form of a plane. The reflective surface 154 is not completely parallel to the light facing surface 153, but extends substantially parallel to the light facing surface 153. For example, the reflective surface 154 may be parallel to a plane contacting an end portion of the light facing surface 153.

According to an embodiment, the reflective surface 154 may be coated with a material having high reflectance for reflection of light. The reflective surface 154 may include various members that reflect light. For example, according to an embodiment, a reflective member may be added to the reflective surface 154 for reflection of light.

Assuming a virtual surface that passes through an end portion of the light incident surface 151 and is perpendicular to the light incident surface 151 and the light exit surface 157, hereinafter referred to as a vertical surface 155, the reflective surface 154 forms a predetermined angle with respect to the vertical surface 155. Assuming that a normal line to the light incident surface 151, which passes through an end portion of the light incident surface 151 when viewed in a plan view, is a first normal line, the first normal line is provided on the vertical surface 155. As a result, the reflective surface 154 forms the predetermined angle with respect to the first normal line.

When the reflective surface 154 forms an angle of β with respect to the first normal line to the light incident surface 151, which passes through the end portion of the light incident surface 151, β satisfies the following Equation 1:

$$\beta = \frac{\pi}{2} - \frac{(\alpha + \phi)}{2}$$ [Equation 1]

In Equation 1, α is an angle between a normal line (second normal line) to the light incident surface 151 passing through the light source 160 and a straight line linking the light source 160 with a center of the reflective surface 154 when viewed in a plan view, and φ is an angle between a normal line (third normal line) to the light incident surface 151 passing through a center of the light incident surface 151 and a straight line linking the light source 160 with a point on the light facing surface 152, when viewed in a plan view, wherein at the point, the third normal line and the light facing surface 153 meet each other. β is set such that the light output from the light source 160 can be reflected parallel to the absorption surfaces 152 by the reflective surface 154, for example, such that a dark portion does not occur at a side portion of the light guide plate 150.

Referring to FIG. 2B, β is a function of α and φ. α and φ are parameters varying according to the position of the light source 160 or the position of the reflective surface 154.

As a result, β may have various values according to the position of the light source 160 and the position of the reflective surface 154. β may have various values with respect to the first normal line when viewed in a plan view.

According to an embodiment, the light guide plate 150 having the above structure may include a Fresnel lens light guide plate. As a consequence, when a traveling direction of light incident through the light incident surface 151 forms an angle in a predetermined range with respect to the top surface 157 after being reflected several times by the top surface 157, the bottom surface 159, and the light facing surface 153, light is output through the top surface 157. The angle in the predetermined range may vary according to positions of the light source 160, a refractive index at an interface of the light guide plate 150, a thickness between the top and bottom surfaces 157 and 159, and a curvature of the light facing surface 153. The traveling direction of light output from the light guide plate 150 can be changed, and light can be concentrated and output at a narrower angle by linearly changing a thickness of the light guide plate 150. As a result, when a light source having a narrow orientation angle distribution is used, a view angle of an image at a final stage may be narrowed or widened. As a result, the light guide plate 150 can be used for a 3-D image display apparatus of realizing the parallax between left and right eyes of a person as well as a 2-D image display apparatus.

The absorption surfaces 152 and the reflective surfaces 154 are formed at two side portions of the light guide plate 150, so that a path of light traveling in a direction of the side portions of the light guide plate 150 can be changed. As a consequence, dark portions can be reduced from the two side portions of the light guide plate 150. Hereinafter, optical paths obtained when using a light guide plate according to the conventional and optical paths obtained when using the light guide plate 150 according to an exemplary embodiment will be described.

Figure 3A:
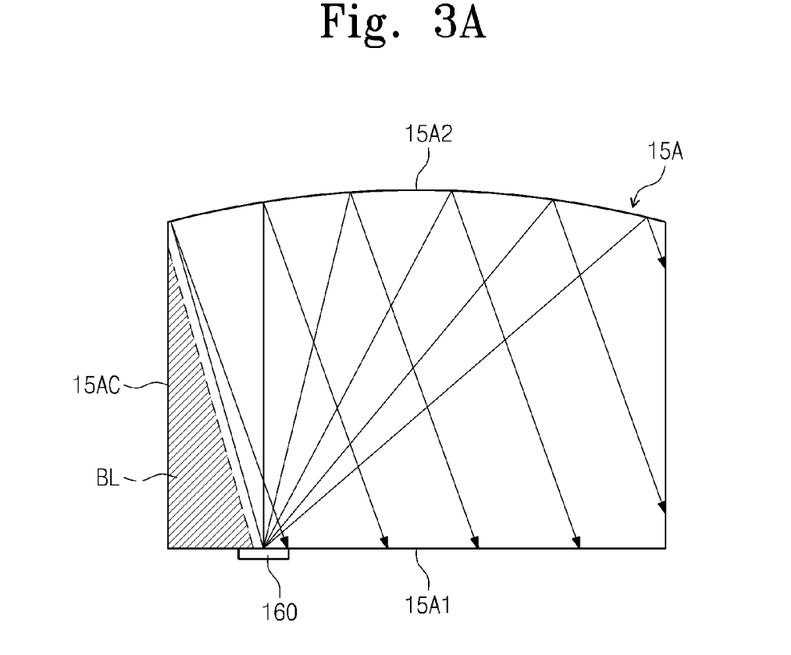
FIG. 3A is a plan view illustrating a traveling direction of light in a light guide plate according to a related art.
Figure 3B:
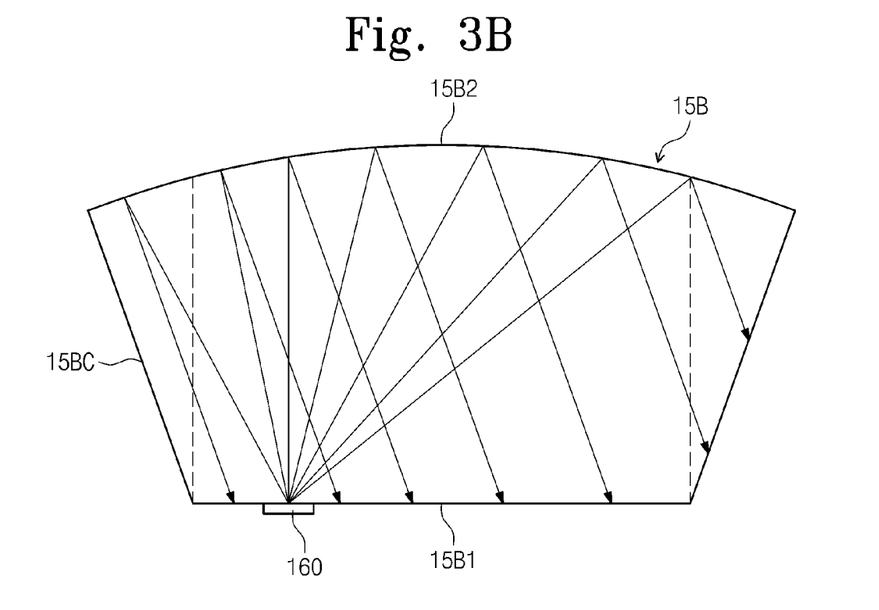
FIG. 3B is a plan view illustrating a traveling direction of light in a light guide plate according to a related art.
Figure 3C:
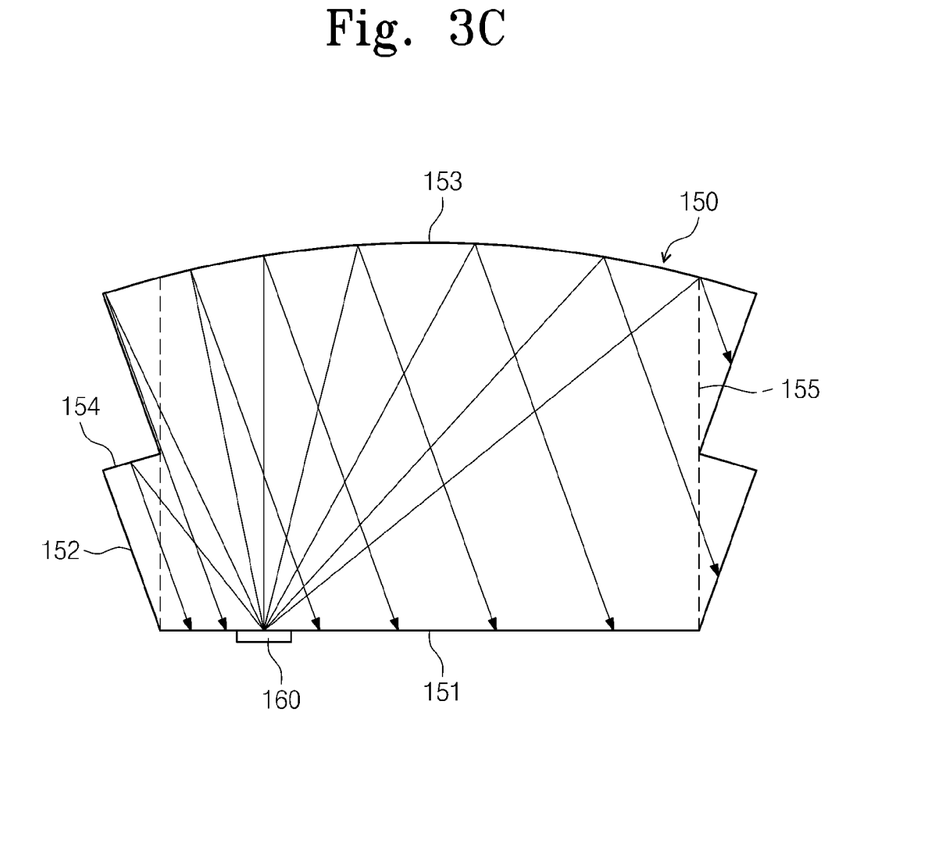
FIG. 3C is a plan view illustrating a traveling direction of light in a light guide plate according to an embodiment of the present invention.

FIGS. 3A and 3B are plan views illustrating paths of light in light guide plates 15A and 15B, respectively, according to the conventional art, and FIG. 3C is a plan view illustrating paths of light of the light guide plate 150 according to an embodiment of the present invention. FIGS. 3A to 3C illustrate only one light source for convenience of description.

Referring to FIG. 3A, a light guide plate 15A includes a light incident surface 15A1, a light facing surface 15A2 that has an arc shape when viewed in a plan view and faces the light incident surface 15A1, and connection surfaces 15AC that connect the light incident surface 15A1 with the light facing surface 15A2 and are perpendicular to the light incident surface 15A1. As shown in FIG. 3A, light outputted from the light source 160 to the light facing surface 15A2 is reflected by the light facing surface 15A2. Light outputted from the light source 160 to the connection surfaces 15AC is not reflected but refracted and output to an outside, or is absorbed by the connection surfaces 15AC. As a result, a portion of the light guide plate 15A, where a great amount of light is reflected, has a high brightness, and two side portions of the light guide plate 15A, where a small amount of light is reflected, have a low brightness. As a result, a dark portion BL is produced at the two side portions of the light guide plate 15A.

FIG. 3B illustrates a light guide plate 15B designed to prevent occurrence of the dark portion according to the conventional art. The light guide plate 15B includes a light incident surface 15B1, a light facing surface 15B2 that has an arc shape and faces the light incident surface 15B1, and connection surfaces 15BC connecting the light incident surface 15B1 with the light facing surface 15B2. The connection surfaces 15BC are respectively parallel to first and second lines linking first and second light sources with a center of the arc. As a result, the light guide plate 15B has a shape of a truncated sector when viewed in a plan view. As shown in FIG. 3B, most of light outputted from the light source 160 to the light facing surface 15B2 is reflected by the light facing surface 15B2 and only a small amount of light travels in a direction of the connection surfaces 15BC. As a result, occurrence of dark portions can be reduced. However, the light guide plate 15B as shown in FIG. 3B has a width narrower than a width of the display panel.

FIG. 3C illustrates the light guide plate 150 according to an embodiment of the present invention. As shown in FIG. 3C, most of light traveling toward the light facing surface 153 from the light source 160 is reflected by the light facing surface 153, and light traveling toward the absorption surfaces 152 from the light source 160 is reflected by the reflective surface 154. As a consequence, no dark portion is produced at two side portions of the light guide plate 150, and a small amount of light travels toward the absorption surfaces 152. These effects may be achieved by increasing the number of the absorption surfaces 152 and the number of the reflective surfaces 154 even without increasing a width of the light guide plate 150.

Figure 4:
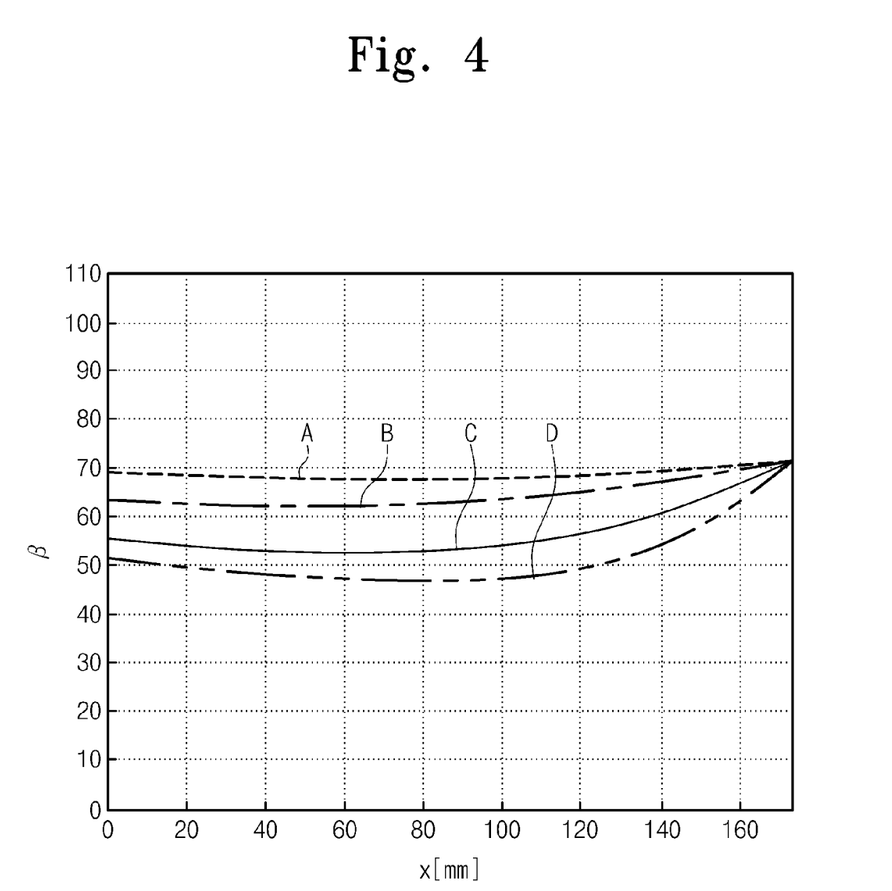
FIG. 4 is a simulation graph illustrating $\beta$ values according to positions of a light source in a light guide plate according to an embodiment of the present invention.

FIG. 4 is a simulation graph illustrating β values according to positions of the light source 160 in the light guide plate 150 as shown in FIGS. 2A to 2C. Referring to FIG. 4, an X axis represents the distance from the center of the light incident surface 151 to the light source 160 when viewed in a plan view, and a Y axis represents β values. Lines A to D of FIG. 4 represent β values when the position of the reflective surface 154 is changed. Referring back to FIG. 2B, when viewed in a plan view, assuming that a distance from a center of the light incident surface 151 to a point, at which the third normal line and the light facing surface 153 meets, is referred to as a first height H1 of the light guide plate 150, a distance from an end of the light incident surface 151 to a point, at which the first normal line and the light facing surface 153 meets, is referred to as a second height H2, and a distance from the end of the light incident surface 151 to a point, at which the second normal line and the reflective surface 154 meets, is referred to as a third height H3, the line A represents an example in which the third height H3 is identical to the first height H1, the line B represents an example in which the third height H3 is ⅓ times as high as the height H1, the line C represents an example in which the third height H3 is ⅔ times as high as the height H1, and the line D represents an example in which the third height H3 is ⅕ times as high as the first height H1. For the simulation of FIG. 4, a distance between two ends of the light incident surface 151, for example, a width of the light incident surface 151 was about 350 mm and the second height H2 was about 220 mm. As the light source 160, an LED was used whose orientation angle ranges from about 60 degrees to about 150 degrees.

Referring to FIG. 4, when the height of the reflective surface 154 is changed or the position of the light source 160 is changed, the β value is changed. However, even though the height of the reflective surface 154 and the position of the light source 160 are changed, the β value represents a range of about 40 degrees to about 75 degrees, more particularly, a range of about 45 degrees to about 70 degrees. As a result, even if the position of the light source 160 is changed, when the β value is in the range of about 40 degrees to about 70 degrees, no dark portion is formed. As a result, the light guide plate 150 represents a uniform light output distribution.

Although two absorption surfaces 152 and one reflective surface 154 between the absorption surfaces 152 are provided at one side of the light guide plate 150 according to the embodiment of the present invention described in connection with FIGS. 2 and 3C, the embodiments of the present invention are not limited thereto. According to an embodiment of the present invention, at least three absorption surfaces 152 and at least two reflective surfaces 154 between two adjacent absorption surfaces 152 may be provided. For example, according to an embodiment of the present invention, five absorption surfaces 152 and four reflective surfaces 154 may be provided.

Figure 5:
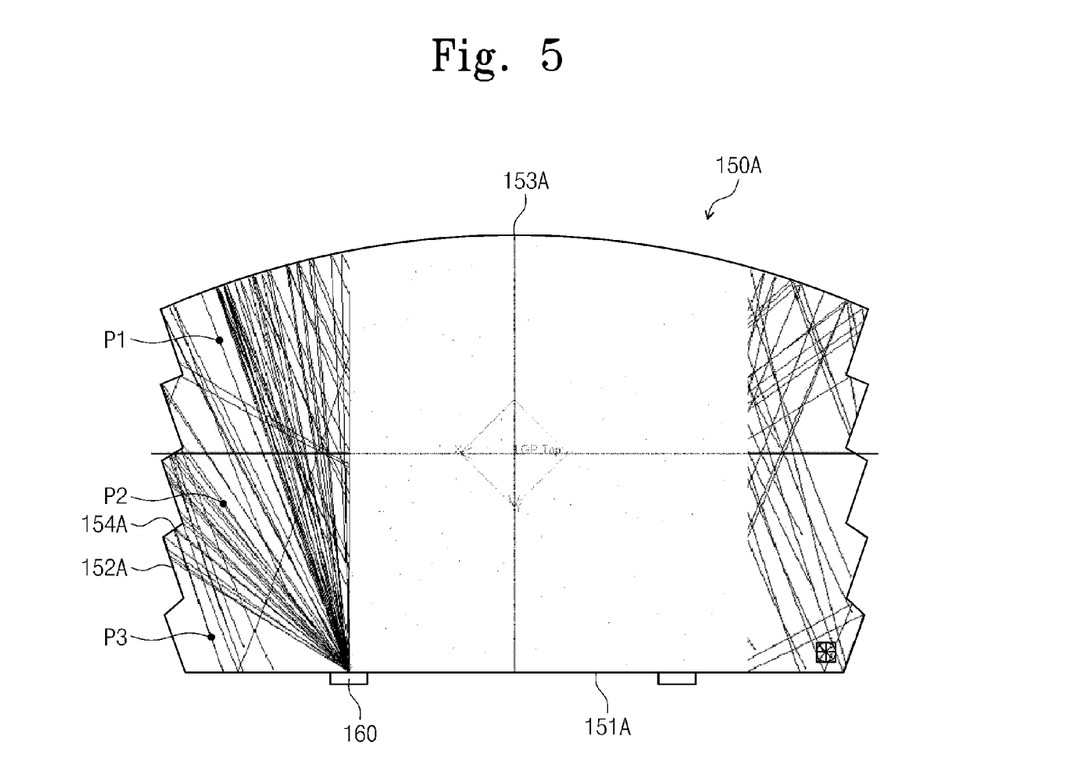
FIG. 5 is a plan view illustrating a light guide plate according to an embodiment of the present invention together with simulated optical paths.

FIG. 5 is a plan view illustrating a light guide plate 150A according to an embodiment of the present invention together with simulated optical paths. For the simulation of FIG. 5, the light guide plate 150A having a width of about 350 mm and a height of about 220 mm was used.

The light guide plate 150A has substantially the same structure as that of the light guide plate 150 described in connection with FIGS. 2A to 2C except that more absorption surfaces 152A and more reflective surfaces 154A are used than the absorption surfaces 152 and reflective surfaces 154 of the light guide plate 150. As shown in FIG. 5, the light guide plate 150A includes five absorption surfaces 152A and four reflective surfaces 154A at a side of the light guide plate 150A.

The plurality of absorption surfaces 152A and the plurality of reflective surfaces 154A are provided, so that a width Dx (see FIG. 2B) can be reduced, where Dx represents an extent by which a side portion of the light guide plate is protruded from the first normal line—for example, a distance between the first normal line and a virtual point where a virtual extension line of a absorption surface starting from an end of the light incident surface intersects a virtual extension line of the light facing surface. As the number of the absorption surfaces 152A and the number of the reflective surfaces 154A increase, the width Dx is reduced. For example, according to an embodiment, when one absorption surface 152A is provided (when no reflective surface 154A is provided), the width Dx is about 59 mm. When three, five, and ten absorption surfaces 152A are provided, the width Dx is about 20 mm, 12 mm, and 6 mm, respectively.

A dark portion is reduced from two side portions of the light guide plate 150A, and light outputted from the light guide plate 150A has a uniform angle distribution.

The following Table 1 represents the brightness at first to three points P1, P2, and P3 in the light guide plate 150A (marked as "light guide plate 2" in Table 1) and the brightness at points corresponding to the first to third points P1 to P3 in the light guide plate 15A (marked as "light guide plate 1" in Table 1) shown in FIG. 3A.

TABLE 1

| | Brightness (relative value) | | |
|---|---|---|---|
| | 1$^{st}$ point (P1) | 2$^{nd}$ point (P2) | 3$^{rd}$ point (P3) |
| Light guide plate 1 | 0.799 | 0.154 | 0.179 |
| Light guide plate 2 | 0.979 | 0.881 | 0.794 |

As shown in Table 1, the light guide plate 15A shows considerably low brightness at the second and third points P2 and P3 compared to brightness at the first point P1. This means that the light guide plate 15A has dark portions at the second and third points P2 and P3. In contrast, the light guide plate 150A shows high brightness at all of the first to third points P1 to P3 without a great difference in the brightness. This means that the light guide plate 150A does not have any dark portions.

The following Table 2 represents angles at the first to third points P1, P2, and P3 in the light guide plate 150A (marked as "light guide plate 2" in Table 1) and angles at points corresponding to the first to third points P1 to P3 in the light guide plate 15A (marked as "light guide plate 1" in Table 1). The angles include azimuths and altitude angles measured in relation to traveling directions of light, assuming that the top surface of the light guide plate 150A is referred to as an X-Y plane, an extension direction of the light incident surface 151A is referred to as an X axis direction, a direction perpendicular to the X axis is referred to as an Y axis direction, and a direction from the top surface toward the display panel 120 is referred to as a Z axis direction.

TABLE 2

| Angular distribution (relative value °) | 1$^{st}$ point (P1) | | 2$^{nd}$ point (P2) | | 3$^{rd}$ point (P3) | |
|---|---|---|---|---|---|---|
| | azimuth | altitude angle | azimuth | altitude angle | azimuth | altitude angle |
| Light guide plate 1 | 21.5 | 14 | −17.5 | 5.5 | 30.5 | 5.5 |
| Light guide plate 2 | 21.5 | 14 | 19.5 | 16 | 17.5 | 16 |

As shown in Table 2, no differences in the azimuths and altitude angles at the first point P1 are between the light guide plate 15A and the light guide plate 150A. However, large differences in the azimuths and altitude angles at the second and third points P2 and P3 are present between the light guide plate 15A and the light guide plate 150A. This means that the light guide plate 15A does not have uniform light paths at each of the points P1, P2, and P3.

The light guide plate 150A reflects a majority of light at the reflective surfaces 154A as compared with light guide plates according to the conventional art. As a result, while light beams are output from the top surface, the azimuths and altitude angles at the second and third points P2 and P3 are substantially the same as the azimuths and altitude angles at the first point P1. As described above, the altitude angles are substantially identical at the three points P1 to P3, which represents that light beams are outputted in a uniform direction through the light guide plate 150A.

As shown in Tables 1 and 2, the light guide plate 150A guides light beams in a uniform direction and reduces occurrence of dark portions.

Figure 6:
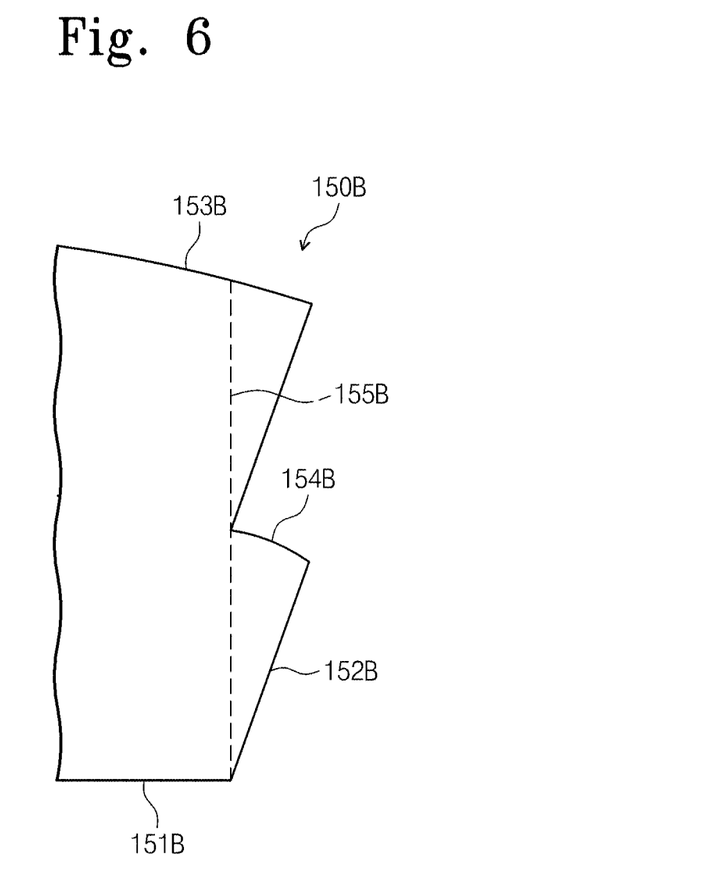
FIG. 6 is a plan view illustrating a light guide plate according to an embodiment of the present invention.

FIG. 6 is a plan view illustrating a light guide plate 150B according to an embodiment of the present invention. The light guide plate 150B has substantially the same structure as that of the light guide plate 150 described in connection with FIG. 2 except that a reflective surface included in the light guide plate 150B has a shape different from that of the light guide plate 150.

Referring to FIG. 6, the light guide plate 150B has a curved reflective surface 154B.

The reflective surface 154B is inclined from a virtual vertical surface 155B at an angle of about 40° to about 75°. Assuming that an angle between a tangential line at a point on the reflective surface 154B and the virtual vertical surface 155B is β when viewed in a plan view, β can satisfy the above Equation 1. According to embodiments, the point on the reflective surface 154B may be one of two end portions of the reflective surface 154B, or may be a middle point between the two end portions of the reflective surface 154B when viewed in a plan view. According to an embodiment, a curvature of the reflective surface 154B may be variously adjusted according to a position of the light source 160, an orientation angle of the light of the light source 160, or a position of the reflective surface 154B.

According to an embodiment, the reflective surface 154B may be parallel to a virtual surface extending along the light facing surface 153B, and as a result, the reflective surface 154B may have the same center as that of the light facing surface 153B and the same curvature as that of the light facing surface 153B. According to an embodiment, the reflective surface 154B may reflect light in the same direction as that of light incident onto the virtual surface corresponding to the reflective surface 154B.

Figure 7:
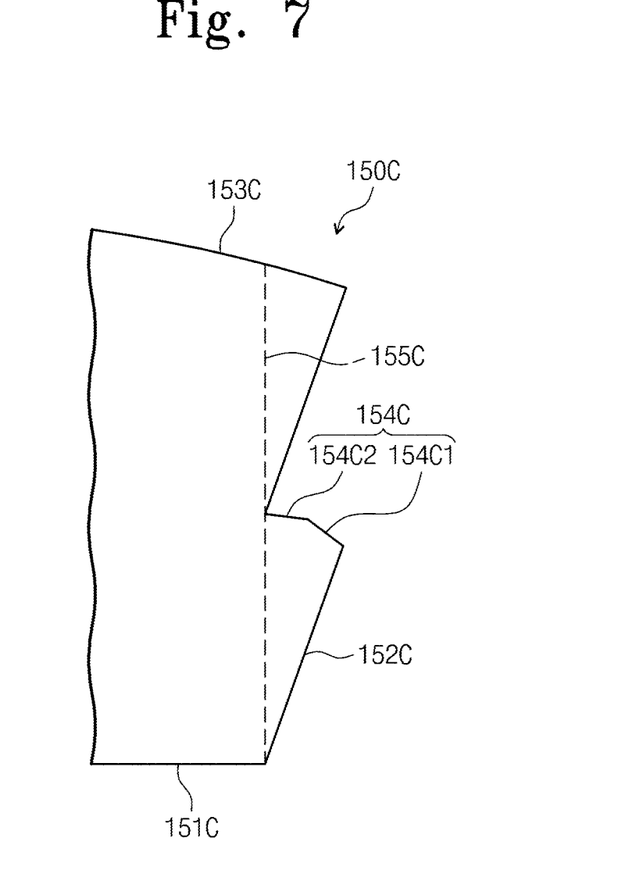
FIG. 7 is a plan view illustrating a light guide plate according to an embodiment of the present invention.

FIG. 7 is a plan view illustrating a light guide plate 150C according to an embodiment of the present invention. The light guide plate 150C has substantially the same structure as that of the light guide plate 150 described in connection with FIG. 2 except that a reflective surface included in the light guide plate 150C has a shape different from that of the light guide plate 150.

Referring to FIG. 7, the light guide plate 150C includes a reflective surface 154C including sub reflective surfaces 154C1 and 154C2 sequentially connected to each other. Although two sub reflective surfaces 154C1 and 154C2 have been illustrated in FIG. 7, the number of sub reflective surfaces is not limited.

Each of the sub reflective surfaces 154C1 and 154C2 has a flat surface. At least one of the sub reflective surfaces 154C1 and 154C2 is inclined from a virtual vertical surface 155C at an angle of about 40° to about 75°. Assuming that an angle between at least one of the sub reflective surfaces 154C1 and 154C2 and the virtual vertical surface 155C is β when viewed in a plan view, β satisfies the above Equation 1. The number, the widths, and the arrangement sequence of the sub reflective surfaces 154C1 and 154C2 can be adjusted according to the position of the light source 160, the orientation angle of light of the light source 160 or the position of the sub reflective surfaces.

Figure 8:
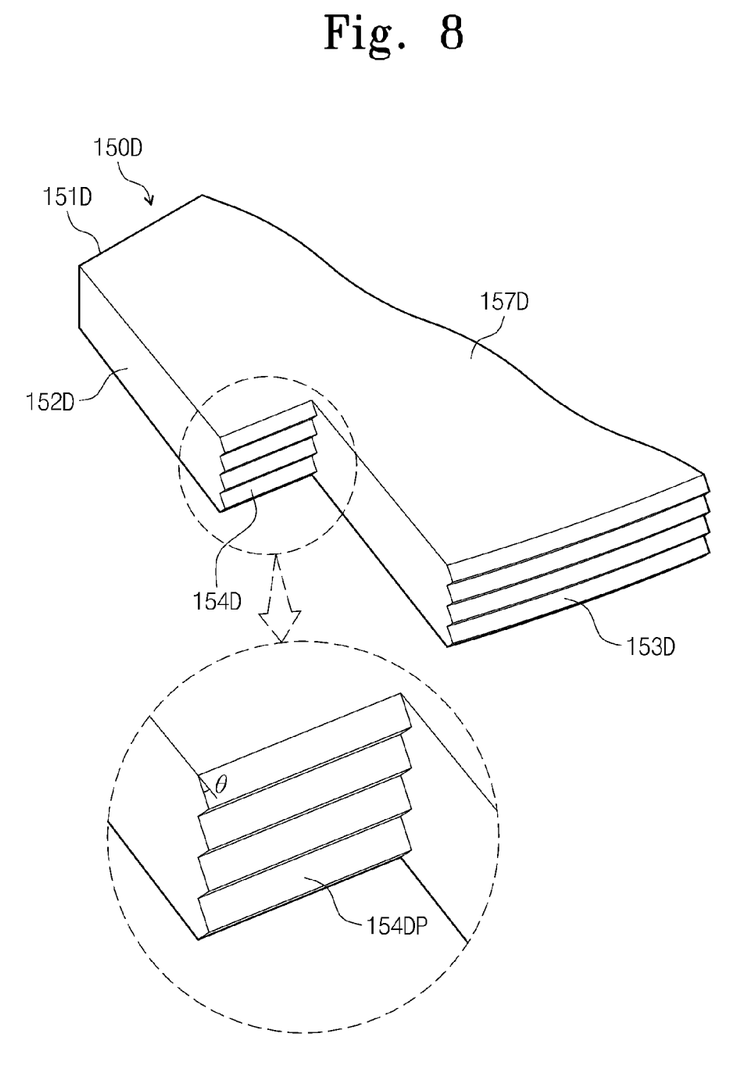
FIG. 8 is a perspective view illustrating a light guide plate according to an embodiment of the present invention.

FIG. 8 is a plan view illustrating a light guide plate 150D according to an embodiment of the present invention. The light guide plate 150D has substantially the same structure as that of the light guide plate 150 described in connection with FIG. 2 except that a reflective surface and a light facing surface included in the light guide plate 150D have shapes different from those of the light guide plate 150.

Referring to FIG. 8, the light guide plate 150D has a protrusion reflection pattern 154DP on each of a reflective surface 154D and a light facing surface 153D to increase reflectance. According to embodiments, the protrusion reflection pattern 154DP may have various patterns to increase reflectance in a specific direction. For example, according to an embodiment, the protrusion reflection pattern 154DP may include a plurality of prism mountains.

FIG. 8 illustrates that the protrusion reflection pattern 154DP of the reflective surface 154D includes prism mountains longitudinally extending parallel to a top surface 157D of the light guide plate 150D. The prism mountains reflect light, which travels toward the reflective surface 154D, to the light incident surface 151D. An angle θ between each prism mountain and the top surface 157D of the light guide plate 150D is set such that light traveling from the light incident surface 151D to the reflective surface 154D is totally reflected. According to embodiments, the angle θ may be in a range of about 5° to about 25°.

The protrusion reflection pattern of the light facing surface 153D includes prism mountains longitudinally extending parallel to the top surface 157D of the light guide plate 150D. The prism mountains of the light facing surface 153D reflect light traveling to the light facing surface 153D back to the light incident surface 151D. An angle θ between each prism mountain and the top surface 157D of the light guide plate 150D is set such that light traveling from the light incident surface 151D to the reflective surface 154D is totally reflected. According to embodiments, the angle θ may be in a range of about 5° to about 25°. According to an embodiment, the protrusion reflection pattern of the light facing surface 153D may have a shape different from that of the reflective surface 154D. For example, according to an embodiment, an angle between each prism mountain of the light facing surface 153D and the top surface 157D of the light guide plate 150D may be different from an angle between each prism mountain of the reflective surface 154D and the top surface 157D of the light guide plate 150D.

Figure 9:
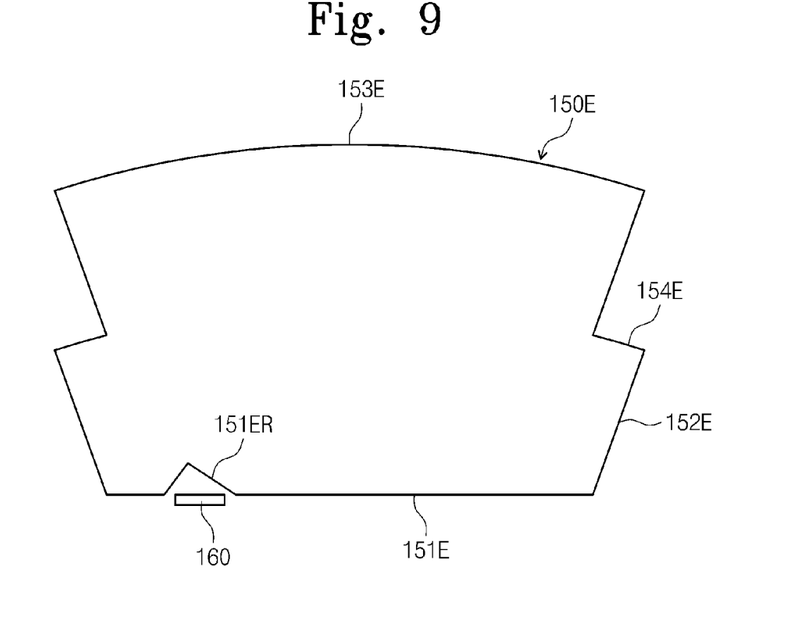
FIGS. 9 to 11 are plan views illustrating light guide plates according to embodiments of the present invention.
Figure 10:
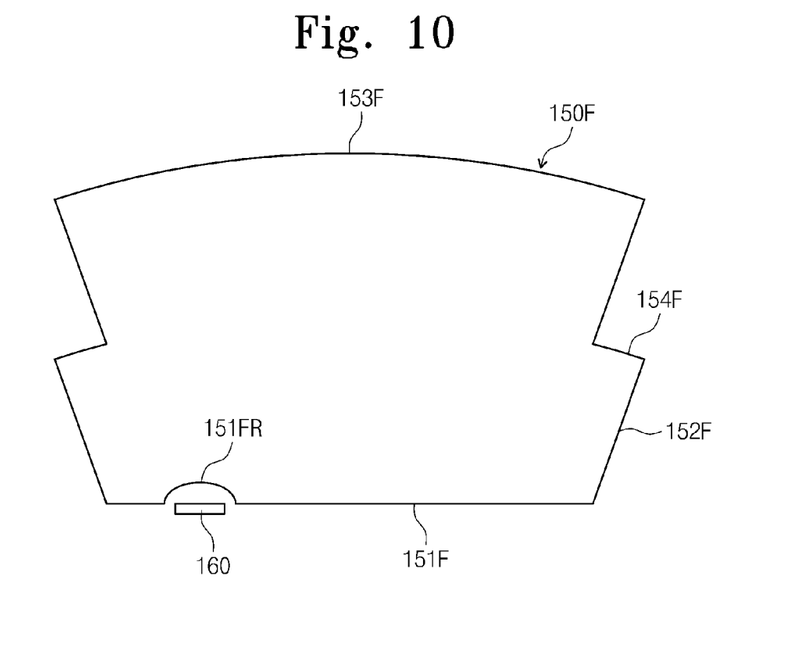
Figure 11:
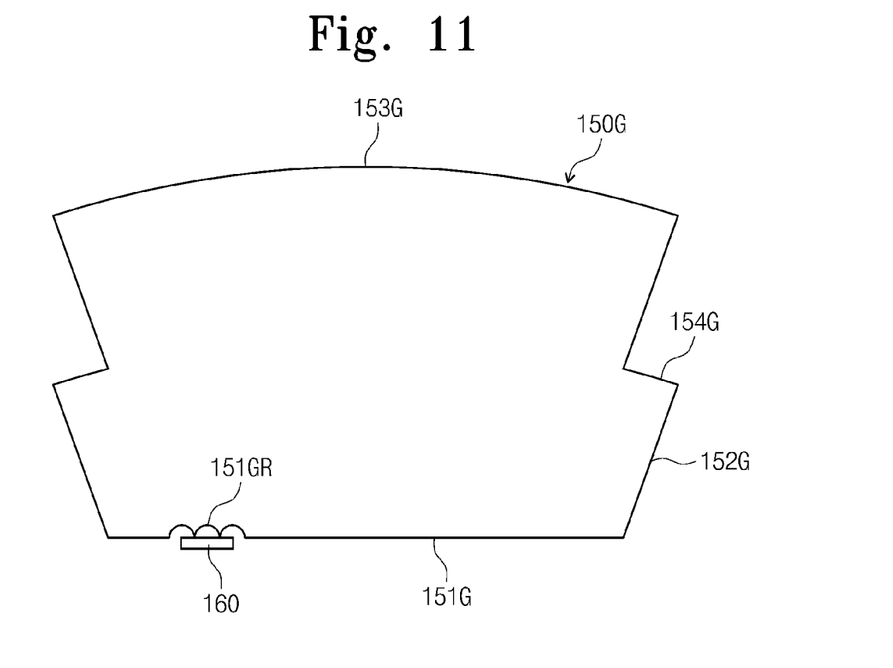

FIGS. 9 to 11 are plan views illustrating light guide plates 150E, 150F, and 150G according to embodiments of the present invention. Each of the light guide plates 150E, 150F, and 150G has substantially the same structure as that of the light guide plate 150 described in connection with FIG. 2 except that a light incident surface included in each of the light guide plates 150E, 150F, and 150G has a shape different from that of the light guide plate 150. FIGS. 9 to 11 illustrate only one light source 160 for convenience of description.

Referring to FIGS. 9 to 11, light incident surfaces of the light guide plates 150E, 150F, and 150G, respectively, include first surfaces 151E, 151F, and 151G extending in a direction and second surfaces 151ER, 151FR, and 151GR that are recessed in the first surfaces 151E, 151F, and 151G, and each of the second surfaces 151ER, 151FR, and 151GR corresponds to the light source 160.

The second surfaces 151ER, 151FR, and 151GR change paths of light incident through the light incident surface 151 such that light can uniformly travel throughout the whole regions of the light guide plates 150E, 150F, and 150G. Light incident through the second surfaces 151ER, 151FR, and 151GR has an orientation angle greater than that of light incident through a light incident surface without the second surface 151ER, 151FR, or 151GR.

The second surfaces 151ER, 151FR, and 151GR, respectively, include a plurality of flat surfaces as shown in FIG. 9, a curved surface 151FR as shown in FIG. 10, and a plurality of curved surfaces as shown in FIG. 11. Although not shown in the figures, according to embodiments, each of the second surfaces 151ER, 151FR, and 151GR may include combinations of at least one flat surface and at least one curved surface.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   at least one light source outputting light;
   a light guide plate guiding the light; and
   a display panel receiving the light from the light guide plate,
   wherein the light guide plate comprises;
      a light incident surface facing the light source and receiving the light;
      a light facing surface reflecting the light toward the light incident surface, the light facing surface having an arc shape;
      a top surface connected with the light incident surface and the light facing surface, the top surface outputting the light, wherein the top surface comprises a flat surface; and
      connection surfaces provided at both sides of the light incident surface to connect the light incident surface with the light facing surface, wherein the connection surfaces are substantially perpendicular to the top surface,
   wherein each of the connection surfaces comprises at least two absorption surfaces and at least one reflective surface provided between the two adjacent absorption surfaces, the reflective surface reflecting the light, and each of the connection surfaces has a stepped surface.

2. The display apparatus of claim 1, wherein the at least two absorption surfaces are parallel to a line linking a center of the arc with the light source.

3. The display apparatus of claim 2, wherein an angle β between the reflective surface and a first normal line to the light incident surface passing through an end portion of the light incident surface is in a range of about 40° to about 75°.

4. The display apparatus of claim 3, wherein the angle β satisfies a following equation:

$$\beta = \frac{\pi}{2} - \frac{(\alpha + \phi)}{2}$$

wherein α refers to an angle between a second normal line to the light incident surface passing through the light source and a center of the reflective surface, and φ refers to an angle between a third normal line to the light incident surface passing through a center of the light incident surface and a straight line linking the light source with a point at which the third normal line and the light facing surface meet each other.

5. The display apparatus of claim 2, wherein the reflective surface comprises a flat surface.

6. The display apparatus of claim 5, wherein the reflective surface is parallel to one of tangential lines to the arc at two ends of the arc.

7. The display apparatus of claim 1, wherein the reflective surface comprises a plurality of sub reflective surfaces connected with each other.

8. The display apparatus of claim 1, wherein the reflective surface comprises a curved surface.

9. The display apparatus of claim 1, further comprising a protrusion reflection pattern projecting upward from each reflective surface.

10. The display apparatus of claim 9, wherein the protrusion reflection pattern comprises a plurality of prisms, wherein a lateral surface of each prism forms an angle of about 520 to about 25° with respect to the top surface.

11. The display apparatus of claim 1, further comprising a protrusion reflection pattern projecting from the light facing surface.

12. The display apparatus of claim 11, wherein the protrusion reflection pattern comprises a plurality of prisms.

13. The display apparatus of claim 1, wherein the light incident surface comprises a first surface extending in a direction and a second surface recessed in the first surface, wherein the second surface corresponds to the light source.

14. The display apparatus of claim 13, wherein the second surface comprises a plurality of flat surfaces.

15. The display apparatus of claim 14, wherein the second surface comprises at least one curved surface.

16. The display apparatus of claim 1, wherein the light guide plate further comprises a bottom surface facing the top surface, and
a thickness between the top surface and the bottom surface is gradually increased in a direction away from the light incident surface.

17. A light guide plate comprising:
a light incident surface receiving light;
a light facing surface reflecting the light, the light facing surface having a shape of an arc;
a connection surface connecting the light incident surface with the light facing surface; and
a top surface connected with the light incident surface, the light facing surface, and the connection surface, the top surface outputting the light,
wherein the connection surface comprises at least two absorption surfaces and at least one reflective surface provided between the two adjacent absorption surfaces, the reflective surface reflecting the light, and wherein the connection surface is substantially perpendicular to the top surface , and the connection surface has a stepped surface,
wherein an angle β between the reflective surface and a first normal line to the light incident surface passing through an end portion of the light incident surface satisfies a following equation:

$$\beta = \frac{\pi}{2} - \frac{(\alpha + \phi)}{2},$$

wherein α refers to an angle between a second normal line to the light incident surface passing through a first point on the incident surface, onto which the light is incident from an outside, and a center of each reflective surface, and φ refers to an angle between a third normal line to the light incident surface passing through a center of the light incident surface and a straight line linking the first point with a second point at which the third normal line and the light facing surface meets each other.

18. The light guide plate of claim 17, wherein the at least two absorption surfaces are parallel to a line linking a center of the arc with the light source.

19. The light guide plate of claim 17, wherein an the angle β is in a range of about 40° to about 75°.

20. The light guide plate of claim 17, wherein the reflective surface comprises a flat surface or a curved surface.

21. The light guide plate of claim 17, wherein each reflective surface comprises sub reflective surfaces connected to each other.

22. A light guide plate comprising:
a light incident surface receiving light from a light source;
a light facing surface facing the light incident surface, the light facing surface having a rounded shape, wherein the light facing surface reflects the light toward the light incident surface;
a top surface that is connected with the light incident surface and the light facing surface, wherein the light is exited through the top surface, wherein the top surface comprises a flat surface; and
connection surfaces connecting two ends of the light incident surface with two ends of the light facing surface, respectively, wherein the connection surfaces are substantially perpendicular to the top surface,
wherein each of the connection surfaces comprises at least two absorption surfaces parallel to a line linking a center of the arc with the light source and at least one reflective surface between two adjacent absorption surfaces,
wherein the reflective surface reflects the light toward the light incident surface, and each of the connection surfaces has a stepped surface.

* * * * *